(12) United States Patent
Dokas et al.

(10) Patent No.: US 6,199,962 B1
(45) Date of Patent: Mar. 13, 2001

(54) HYDRAULIC CONTROL UNIT FOR A VEHICULAR BRAKE SYSTEM HAVING A SELF-PRIMING PUMP

(75) Inventors: David M. Dokas, Redford; Blaise J. Ganzel, Ann Arbor, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/344,203

(22) Filed: Jun. 24, 1999

Related U.S. Application Data

(60) Provisional application No. 60/091,636, filed on Jul. 2, 1998, and provisional application No. 60/113,429, filed on Dec. 23, 1998.

(51) Int. Cl.⁷ .................................................. F04B 53/00
(52) U.S. Cl. .................. 303/116.4; 303/10; 417/470; 417/549
(58) Field of Search .......................... 303/10, 11, 116.4; 417/470, 549

(56) References Cited

U.S. PATENT DOCUMENTS

| | | |
|---|---|---|
| 3,446,156 | 5/1969 | Lightfoot . |
| 4,725,102 | 2/1988 | Ando et al. . |
| 5,628,625 | * 5/1997 | Dokas ................................. 417/523 |
| 6,042,350 | * 3/2000 | Beck ..................................... 417/549 |
| 6,093,003 | * 7/2000 | Hauser et al. ....................... 417/541 |

FOREIGN PATENT DOCUMENTS

| | | |
|---|---|---|
| 1 653 404 | 10/1970 | (DE) . |
| 76 31 318 | 2/1978 | (DE) . |
| 36 11 267 | 10/1986 | (DE) . |
| 38 07 552 | 9/1989 | (DE) . |
| 39 01 058 | 7/1990 | (DE) . |
| 41 02 803 | 8/1992 | (DE) . |
| 41 07 979 | 9/1992 | (DE) . |
| 43 16 986 | 11/1994 | (DE) . |
| 197 12 147 | 3/1998 | (DE) . |
| 0 344 544 | 12/1989 | (EP) . |
| 0 446 454 | 9/1991 | (EP) . |
| 1 344 035 | 1/1974 | (GB) . |

* cited by examiner

Primary Examiner—Christopher P. Schwartz
(74) Attorney, Agent, or Firm—MacMillan, Sobanski & Todd, LLC

(57) ABSTRACT

A hydraulic control unit of a vehicular brake system includes a housing having a cavity. Drive means is received in the cavity of the housing. A fluid supply source is in fluid communication with the housing. A piston slidably is disposed in the housing. The piston includes a first end and a second end wherein the second end is in contact with the drive means so that the piston moves from a bottom-dead-center position to a top-dead-center position. Biasing means is in contact with the first end of the piston so that the piston moves from a top-dead-center position to the bottom-dead-center position. A first variable-volume chamber is defined by the piston and the housing whereby fluid is transferred from the first variable-volume chamber when the piston moves from the bottom-dead-center position. A constant-volume chamber is defined by the piston and the housing, whereby fluid is transferred from the fluid supply source to the first variable-volume chamber when the piston moves from the top-dead-center position to the bottom-dead-center position. A second variable volume chamber is defined by the piston and the housing, whereby fluid is transferred from the fluid supply source to the second variable-volume chamber when the piston moves from the bottom-dead-center position to the top-dead-center position.

14 Claims, 5 Drawing Sheets

HYDRAULIC CONTROL UNIT FOR A VEHICULAR BRAKE SYSTEM HAVING A SELF-PRIMING PUMP

CROSS REFERENCE TO RELATED APPLICATIONS

This claims the benefit of U.S. provisional patent applications identified as application Ser. No. 60/091,636 filed Jul. 2, 1998 and application Ser. No. 60/113,429 filed Dec. 23, 1998.

BACKGROUND OF THE INVENTION

This invention relates in general to vehicular brake systems. More specifically, this invention relates to a hydraulic control unit having a self-priming pump for use in a vehicular brake system.

Conventional vehicular brake systems having anti-lock brake, traction control and/or vehicle stability control functions employ a hydraulic control unit. A typical hydraulic control unit used in these types of brake systems includes a housing having multiple fluid control valves or isolation valves for modulating the flow of fluid to a plurality of wheel brakes during designated braking events. The housing further includes multiple fluid control valves or dump valves for modulating hydraulic flow from the wheel brakes during designated braking events. During these designated braking events, a pump, disposed in the housing, transfers fluid from a master cylinder to the wheel brakes, and vice versa. The pump includes a pair of opposing pistons and sleeves. Each pair of pistons and sleeves defines a single variable-volume chamber. Each variable-volume chamber includes an inlet in fluid communication with the master cylinder and at least one of the dump valves. Each variable-volume chamber further includes an outlet in fluid communication with the master cylinder and at least one of the isolation valves.

Pump efficiency is defined by the flow rate of the fluid transferred from the variable-volume chambers divided by the flow rate capacity of the pump. The flow rate capacity of the pump is defined by the pump cycle rate multiplied by the combined volumes of the variable-volume chambers.

It is a noted concern that the pump efficiency is reduced when the temperature of the fluid decreases and/or when the pump cycle rate is increased. The reduction in the pump efficiency is significantly due to the drag placed on the fluid supplied to the variable-volume chambers, which in turn places a limit on the flow rate of the fluid supplied to the variable-volume chambers. The drag placed on the fluid supplied to the pump becomes more pronounced when additional components are placed in the fluid flow path of a given variable-volume chamber in advance of the inlet of the variable-volume chamber.

Accordingly, there is a need for a hydraulic control unit having a pump capable of operating efficiently at low ambient temperatures and/or at an increased pump rate.

It is also known that during braking events in which the pump draws fluid from the master cylinder while an operator is applying force to the brake pedal that the brake pedal may "shutter" or exhibit a stepped displacement. The stepped displacement of the brake pedal is a result of the pump displacing fluid from the master cylinder in an intermittent manner. In other words, the pump does not draw fluid from the master cylinder in a continuous manner, rather the pump only draws fluid from the master cylinder when moving from a top-dead-center position to a bottom-dead-center position. Consequently, the pump causes the brake pedal to shutter when the pump draws fluid from the master cylinder and the operator is applying force to the brake pedal.

Accordingly, there is a further need for a hydraulic control unit having a pump that reduces shuttering of a brake pedal associated with braking events in which the pump draws fluid from a master cylinder while an operator is applying force to the brake pedal.

SUMMARY OF THE INVENTION

This invention concerns a hydraulic control unit (HCU) for use in vehicular brake systems. The HCU comprises a housing having a cavity. An eccentric drive means presenting a drive axis is rotatably disposed in the cavity. A sleeve extends from the cavity substantially perpendicular to the drive axis. A first end of a piston is slidably disposed in the sleeve for movement between a bottom-dead-center position and a top-dead-center-position. A second end of the piston extends from the sleeve and engages the drive means. The drive means moves the piston from the bottom-dead-center position to the top-dead-center position during designated braking events. A biasing means moves the piston from the top-dead-center position to the bottom-dead-center position.

The piston and the sleeve form a pump. The pump includes a first variable-volume chamber defined by the piston and the sleeve adjacent to the first end of the piston. A first check valve is placed in fluid communication with the first variable-volume chamber and is adapted for placement in fluid communication with at least one wheel brake. The first check valve prevents fluid from flowing from the corresponding wheel brakes to the first variable-volume chamber while allowing fluid to flow from the first variable-volume chamber to corresponding wheel brakes. Fluid is transferred from the first variable-volume chamber to the corresponding wheel brakes when the piston moves from the bottom-dead-center position to the top-dead-center position.

The piston includes an axial fluid passage for transferring fluid to the first variable-volume chamber. A second check valve is connected to the first end of the piston and is in fluid communication with the fluid passage and the first variable-volume chamber. The second check valve prevents fluid from flowing from the first variable-volume chamber to the fluid passage while allowing fluid to flow from the fluid passage to the first variable-volume chamber.

The pump further includes a constant-volume chamber defined by the piston and the sleeve between the first and second ends of the piston. The constant-volume chamber is connected in fluid communication with the fluid passage and an inlet channel formed in the sleeve. The inlet channel is adapted for placement in fluid communication with a fluid supply source, such as a master cylinder. Fluid is transferred from the fluid supply source to the first variable-volume chamber through the inlet channel and the fluid passage when the piston moves from the top-dead-center position to the bottom-dead-center position.

The pump further includes a second variable-volume chamber defined by the piston and the sleeve adjacent the constant-volume chamber. The second variable-volume chamber is connected in fluid communication with the fluid passage. Fluid is transferred to the second variable-volume chamber from the inlet channel through the fluid passage when the piston moves from the bottom-dead-center position to the top-dead-center position. Fluid is transferred from the second variable-volume chamber through the fluid passage to the first variable-volume chamber when the piston moves from the top-dead-center position to the bottom-dead-center position. Accordingly, the second variable-volume chamber acts to prime the first variable-volume chamber.

Preferably, the constant-volume chamber is formed between the first and second variable-volume chambers. Alternatively, the orientation of the constant-volume chamber and the second variable-volume chamber may be reversed. In the preferred embodiment, the fluid flow characteristics of the fluid transferred from the second variable-volume chamber through the fluid passage assists in the transfer of fluid from the fluid supply source through the constant-volume chamber to the first variable-volume chamber.

This invention increases pump efficiency, in that fluid is supplied to the first variable-volume chamber from both the inlet channel and the second variable-volume chamber when the piston moves from the top-dead-center position to the bottom-dead-center position. In the preferred embodiment, pump efficiency is further increased by fluid being drawn from the constant-volume chamber by the fluid transferred from the second variable-volume chamber to the first variable-volume chamber. Most notably, the pump efficiency is significantly increased when the fluid is at low operating temperatures and/or when the pump cycle rate is increased.

Accordingly, this invention provides a hydraulic control unit for use in a vehicular brake system having a self-priming pump capable of operating efficiently at low ambient temperatures and/or an increased pump rate.

Additionally, this invention reduces the shuttering of a brake pedal caused by a pump drawing fluid from a master cylinder. Specifically, the pump according to this invention draws fluid from the fluid supply when moving both from the top-dead-center position to the bottom-dead-center position and vice versa. As a result, fluid is displaced from the fluid source in a nearly continuous manner as opposed to in an intermittent manner. Consequently, the displacement of a brake pedal due to this pump drawing fluid from a master cylinder is more gradual or less abrupt than the brake pedal displacement associated with prior art devices during like braking events.

Accordingly, this invention further provides a hydraulic control unit having a self-priming pump that reduces shuttering of a brake pedal associated with the pump drawing fluid from a master cylinder when an operator is applying force to the brake pedal.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
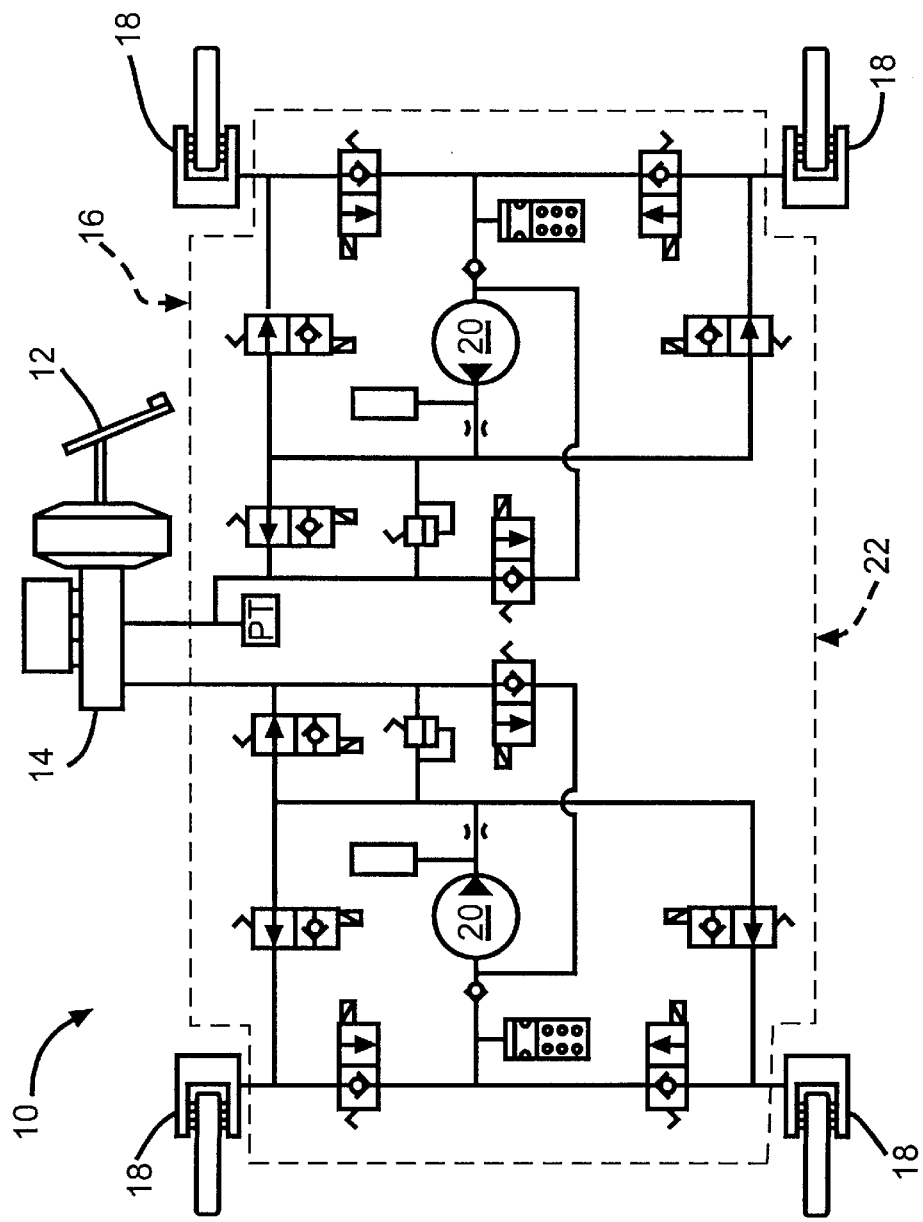
FIG. 1 is a schematic circuit diagram of a vehicular brake system having a hydraulic control unit according to this invention.

A vehicular brake system is shown generally at 10 in FIG. 1. The vehicular brake system 10 includes a brake pedal 12 connected to a master cylinder 14. A hydraulic control unit (HCU), indicated generally at 16, is connected in fluid communication with the master cylinder 12 and a plurality of wheel brakes 18. The wheel brakes 18 are shown as disc brakes but may be of any well-known type.

The HCU 16 includes a dual reciprocating piston pump 20 disposed in a housing 22 for transferring fluid from the master cylinder 12 to the wheel brakes 18 and vice versa. The HCU 16 further includes various valves and other components disposed in the housing 22 and placed in fluid communication with the pump 20 for providing anti-lock braking, traction control, vehicle stability control and dynamic rear brake proportioning functions.

It is understood that for other vehicular brake systems the HCU 16 may include additional, less or differing components. Such components may be placed in different fluid communication arrangements depending on the specified performance requirements and/or functions provided by the designated vehicular brake system.

Figure 2:
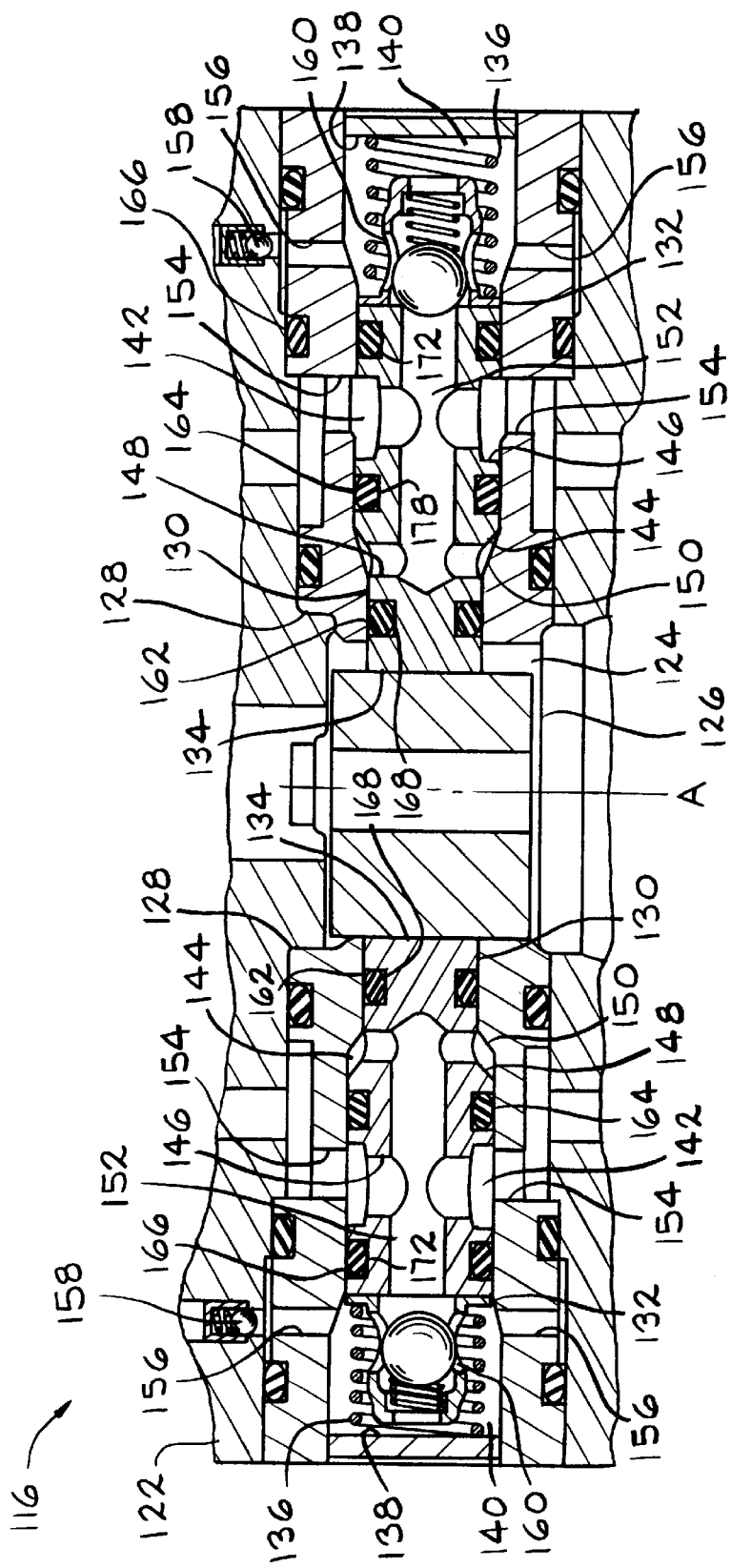
FIG. 2 is a sectional view of a portion of a first embodiment of the hydraulic control unit shown schematically in FIG. 1.

A sectional view of a portion of a first embodiment of a HCU is shown generally at 116 in FIG. 2. The HCU 116 may take the place of the HCU 16 schematically shown in FIG. 1. The HCU 116 includes a housing 122 having a cavity 124. An eccentric drive means 126, presenting a drive axis A, is rotatably disposed in the cavity 124. A motor (not shown) drives the eccentric drive means 126. A controller (not shown) actuates the motor during designated braking events. The eccentric drive means 126, motor, and controller are each well known.

Each of two sleeves 128 extends from the cavity 124 opposite the other sleeve 128 and substantially perpendicular to the drive axis A. A piston 130, having a first end 132 and a second end 134, is slidably disposed in each sleeve 128 for movement between a bottom-dead-center position and a top-dead-center position. FIG. 2 shows the piston 130 positioned to the right of the cavity 124 in the bottom-dead-center position and the other piston 130 in the top-dead-center position. The second ends 134 extend from the sleeves 128 and engage the eccentric drive means 126. The eccentric drive means 126 alternatively moves the pistons 130 from the bottom-dead-center position to the top-dead-center position. The sleeves 128 guide the reciprocation of the pistons 130. In other embodiments, a bore is the housing 122 may act to guide the pistons 130 and eliminate the sleeves 128.

A biasing means moves the pistons 130 from the top-dead-center position to the bottom-dead-center position. Preferably, the biasing means includes a spring 136 disposed in each sleeve 128 between an enclosed end 138 of the corresponding sleeve 128 and the first end 132 of the corresponding piston 130. The springs 136 maintain engagement of the pistons 130 with the eccentric drive means 126.

Each piston 130 and corresponding sleeve 128 define a first variable-volume chamber 140, a constant-volume chamber 142 and a second variable-volume chamber 144. Each first variable-volume chamber 140 is bounded by the corresponding first end 132, the corresponding enclosed end 138, and the inner diametric surface of the corresponding sleeve 128 between the corresponding first end 132 and the corresponding enclosed end 138. Each constant-volume chamber 142 is bounded by the inner diametric surface of the corresponding sleeve 128 and an annular recess 146 formed in the corresponding piston 130. Each second variable-volume chamber 144 is bounded by the inner diametric surface of the corresponding sleeve 128, the outer diametric surface of the corresponding piston 130, a stepped portion 148 of the corresponding piston 130 adjacent the recess 146, and a stepped portion 150 of the corresponding sleeve 128 adjacent the corresponding second end 134.

Each piston 130 includes an axial fluid passage 152 connected in fluid communication with the corresponding first variable-volume chamber 140, the corresponding constant-volume chamber 142 and the corresponding second variable-volume chamber 144.

Each sleeve 128 includes a pair of inlet channels 154 extending from the corresponding constant-volume chamber 142. The inlet channels 154 are adapted for placement in fluid communication with a fluid supply source (not shown). The fluid supply source may be of any desired type such as the master cylinder 14 shown in FIG. 1. The placement and size of the inlet channels 154 is such that fluid communication is maintained between the inlet channels 154 and the corresponding constant-volume chamber 142 as the pistons 130 move between the bottom-dead center and top-dead-center positions. As can be appreciated, a single inlet channel (not shown) may be used in place of the pair of inlet channels 154. Additionally, as previously mentioned, various components may be placed in fluid communication between the inlet channels 154 and the fluid supply source.

Each sleeve 128 further includes a pair of outlet channels 156 extending from the corresponding first variable-volume chamber 140. The outlet channels 156 are adapted for placement in fluid communication with at least one corresponding wheel brake (not shown), such as the wheel brakes 18 shown in FIG. 1.

A first check valve 158 is connected in fluid communication with each pair of outlet channels 156 and the corresponding wheel brakes. The first check valves 158 prevent fluid from flowing from the wheel brakes to the first variable-volume chambers 140 while allowing fluid to flow from the first variable-volume chambers 140 to the wheel brakes. The first check valves 158 are shown disposed in the housing 122. Alternatively, a first check valve (not shown) may be disposed in each of the outlet channels 156. It is also understood that various components may be placed in fluid communication between the first check valves 158 and the wheel brakes.

A second check valve 160 is connected in fluid communication with each fluid passage 152 and the corresponding first variable-volume chamber 140. The second check valves 160 prevent fluid from flowing from the first variable-volume chambers 140 to the fluid passages 152 while allowing fluid to flow from the fluid passages 152 to the first variable-volume chambers 140.

Each piston 130 further includes first, second and third annular grooves 162, 164 and 166, respectively. Each first groove 162 is adjacent the corresponding second end 134. Each second groove 164 is between the corresponding second variable-volume chamber 144 and the corresponding constant-volume chamber 142. Each third groove 166 is adjacent the corresponding first end 132. A first sealing member 168 is disposed in the first groove 162 for preventing fluid from flowing from the second variable-volume chamber 144 to the cavity 124. A second sealing member 170 is disposed in the second groove 164 for preventing fluid from flowing between the second variable-volume chamber 144 and the constant-volume chamber 142. A third sealing member 172 is disposed in the third groove 164 for preventing fluid from flowing between the constant-volume chamber 142 and first variable-volume chamber 140. The sealing members 168, 170, 172 are shown as O-rings, but may be of any suitable type.

In operation, the controller actuates the motor during designated braking events. In turn, the motor rotates the eccentric drive means 126. The eccentric drive means 126 then alternatively moves the pistons 130 from the bottom-dead-center positions to the top-dead-center positions. At the same time, the springs 136 alternatively move the pistons 130 from the top-dead-center positions to the bottom-dead-center positions.

When moving the pistons 130 from the bottom-dead-center positions to the top-dead-center positions, the volumes of the first variable-volume chambers 140 and the second variable-volume chambers 144 decrease and increase, respectively, thereby causing the fluid pressures in the first variable-volume chambers 140 and the second variable-volume chambers 144 to increase and decrease, respectively. As the pistons 130 begin to move toward the top-dead-center positions, the second check valves 160 close, thereby preventing the flow of fluid from the first variable-volume chambers 140 to the fluid passages 152. When the fluid pressure in the first variable-volume chambers 140 reaches the predetermined working pressure of the first check valves 158, the first check valves 158 open, thereby allowing fluid to flow from the first variable-volume chambers 140 to the wheel brakes. The flow of fluid from the first variable-chambers 140 to the wheel brakes ceases approximately when the pistons 130 reach the top-dead-center positions.

As the volumes of the second variable-volume chambers 144 increase, a positive pressure differential between the fluid pressure in the fluid supply source and the fluid pressures in the second variable-volume chambers 144 is created. Consequently, fluid is transferred from the fluid supply source through the inlet channels 154, the constant-volume chambers 142, and the fluid passages 152 to the second variable-volume chambers 144. The fluid flow from the fluid supply source to the second variable-volume chambers 144 ceases approximately when the pistons 130 reach the top-dead-center positions. As the pistons 130 begin to move from the top-dead-center positions, the first check valves 158 close, thereby preventing the flow of fluid from the wheel brakes to the first variable-volume chambers 140.

When moving the pistons 130 from the top-dead-center positions to the bottom-dead-center positions, the volumes of the first variable-volume chambers 140 and the second variable-volume chambers 144 increase and decrease, respectively, thereby causing the fluid pressures in the first variable-volume chambers 140 and the second variable-volume chambers 144 to decrease and increase, respectively. Consequently, a positive pressure differential is established between the fluid in the second variable-volume chambers 144 and the fluid in the first variable-volume chambers 140, as well as, between the fluid in the fluid supply source and the fluid in the first variable-volume chambers 140, thereby promoting the flow of fluid from the second variable-volume chambers 144 and the fluid supply source to the first variable volume chambers 140. As the pistons 130 continue to move toward the bottom-dead-center positions, the second check valves 160 are forced open when the pressurized fluid acting on the second check valves 160 exceeds the predetermined working pressure of the second check valves 160. Fluid is then transferred from the fluid supply source and the second variable-volume chambers 144 to the first variable-volume chambers 140 until the pistons 130 reach the bottom-dead-center positions. Preferably, the displaceable volume of the second variable-volume chamber 144 is approximately half of the displaceable volume of the first variable-volume chamber.

In moving the pistons 130 to the bottom-dead-center positions, the fluid pressures of the second variable-volume chambers 144 are greater than the fluid pressure of the fluid supply source. However, the fluid flow from the second variable-volume chambers 144 to the fluid supply source is insignificant, if any. This assertion is supported by the fact that fluid tends to flow in the path of the least resistance. Specifically, the fluid from the second variable-volume chambers 144 would have to bend in the fluid passages 152 in order to flow into the corresponding constant-volume chambers 142 as opposed to traveling straight through the fluid passages 152 to the first variable-volume chambers 140.

Furthermore, test data suggests that the flow of fluid from the second variable-volume chambers 144 past the constant-volume chambers 142 has the effect of dynamically drawing fluid from the constant-volume chambers 142, thereby assisting the flow of fluid from the fluid supply source to the first variable-volume chambers 140.

Moreover, the inclusion of the constant-volume chambers 142 may significantly reduce the fluid pressure drops attributed to fluid entering the fluid passages 152 when fluid is transferred to the first variable-volume chambers 140. Specifically, if the constant-volume chambers 142 were eliminated and the inlet channels 154 were connected in direct fluid communication with the second variable-volume chambers 144, the peak flow rate of fluid entering the fluid passages 152 via the second variable-volume chambers 144 would have to increase by as much as a factor of two in order to achieve flow results comparable to the FIG. 2 embodiment. In turn, the pressure drops of the fluid entering the fluid passages 152 from the second variable-volume chambers 144 would be as much as four times as great when the constant-volume chambers 142 are excluded as compared to when the constant-volume chambers 142 are included. This assertion is based on the fluid property in which the flow rate through a given orifice is defined as being proportionally equal to the area of the given orifice multiplied by the square root of pressure drop across the given orifice. Regarding the FIG. 2 embodiment, if the pressure drop associated with fluid entering the fluid passages 152 from the corresponding constant-volume chamber 142 is no greater than the pressure drop associated with fluid entering the fluid passages 152 from the corresponding second variable-volume chamber 144, then the total pressure drop through a given fluid passage 152 can be reduced by as much as a factor of two when the inlet channels 154 are connected in direct fluid communication with the constant volume-chambers 142 rather than the second variable-volume chambers 144.

Figure 3:
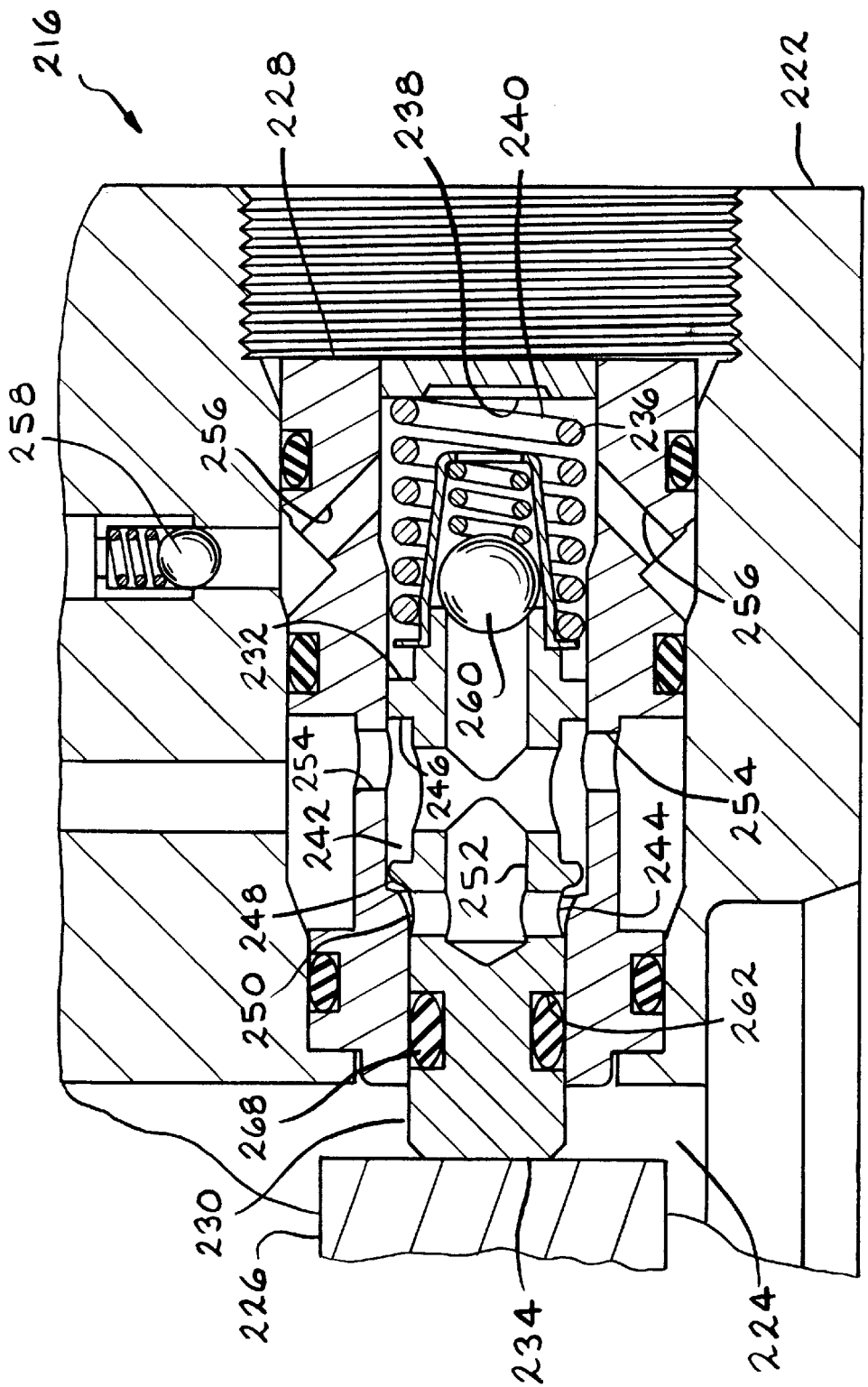
FIG. 3 is a sectional view of a portion of a second embodiment of the hydraulic control unit shown schematically in FIG. 1.

A sectional view of a portion of a second embodiment of a HCU is indicated generally at 216 in FIG. 3. The HCU 216 is similar to the HCU 116 of FIG. 2, and reference numerals in the 200 series are used to indicate like features in the 100 series. The primary differences between the HCU 216 and the HCU 116 is that the second and third grooves 164, 166 of the HCU 116 and their corresponding sealing members 170, 172 have been eliminated in the HCU 216.

The HCU 216 includes a pair of opposing sleeves 228 (only one shown) disposed in a housing 222. A piston 230, having a first end 232 and a second end 234, is slidably disposed in each sleeve 228 for movement between a bottom-dead-center position and a top-dead-center position. FIG. 3 shows the piston 230 in the bottom-dead-center position.

Each piston 230 and corresponding sleeve 228 define a first variable-volume chamber 240, a constant-volume chamber 242 and a second variable-volume chamber 244. Each first variable-volume chamber 240 is bounded by the corresponding first end 232, an enclosed end 238 of the corresponding sleeve 228, and the inner diametric surface of the corresponding sleeve 228 between the corresponding first end 232 and the corresponding enclosed end 238. Each constant-volume chamber 242 is bounded by the inner diametric surface of the corresponding sleeve 228 and an annular recess 246 formed in the corresponding piston 230. Each second-variable volume chamber 244 is bounded by the inner diametric surface of the corresponding sleeve 228, the outer diametric surface of the corresponding piston 234, a stepped portion 248 of the corresponding piston 230 adjacent the recess 246, and a stepped portion 250 of the corresponding sleeve 228 adjacent the corresponding second end 234.

A pair of inlet channels 254 is placed in fluid communication with the recess 246. The inlet channels 254 are also adapted for placement in fluid communication with a fluid supply source (not shown).

Each piston 230 includes an axial fluid passage 252 connected in fluid communication with the corresponding first variable-volume chamber 240, the corresponding constant-volume chamber 242 and the corresponding second variable-volume chamber 244.

The fluid passages 252 and the clearances between pistons 230 and the sleeves 228 adjacent to each side of the recesses 246 are sized so that the fluid flow resistances associated with fluid flow between the chambers 240, 242, 244 about the outer diametric surface of the pistons 230 are significantly greater than the than fluid flow resistances associated with fluid flow between the chambers 240, 242, 244 through the fluid passages 252.

The HCU 216 operates in a like manner to the HCU 116 as described, with an advantage of requiring less power to drive the movement of the pistons 230 due to a reduction in drag between the pistons 230 and the sleeves 228 resulting from the elimination of the second and third sealing members 170, 172 of the HCU 116.

It should be appreciated, despite the pistons 230 lacking sealing members between the constant-variable volume chambers 242 and the first and second variable-volume chambers 240, 244, fluid flow between the chambers 240, 242, 244 takes place substantially through the fluid passages 252 rather than about the outer diametric surfaces of the pistons 230. This flow behavior is due the fluid flow paths associated with the fluid passages 252 offering far less resistance to flow than the fluid flow paths associated with the clearances between the pistons 230 and the sleeves 228 adjacent to the recesses 246.

Figure 4:
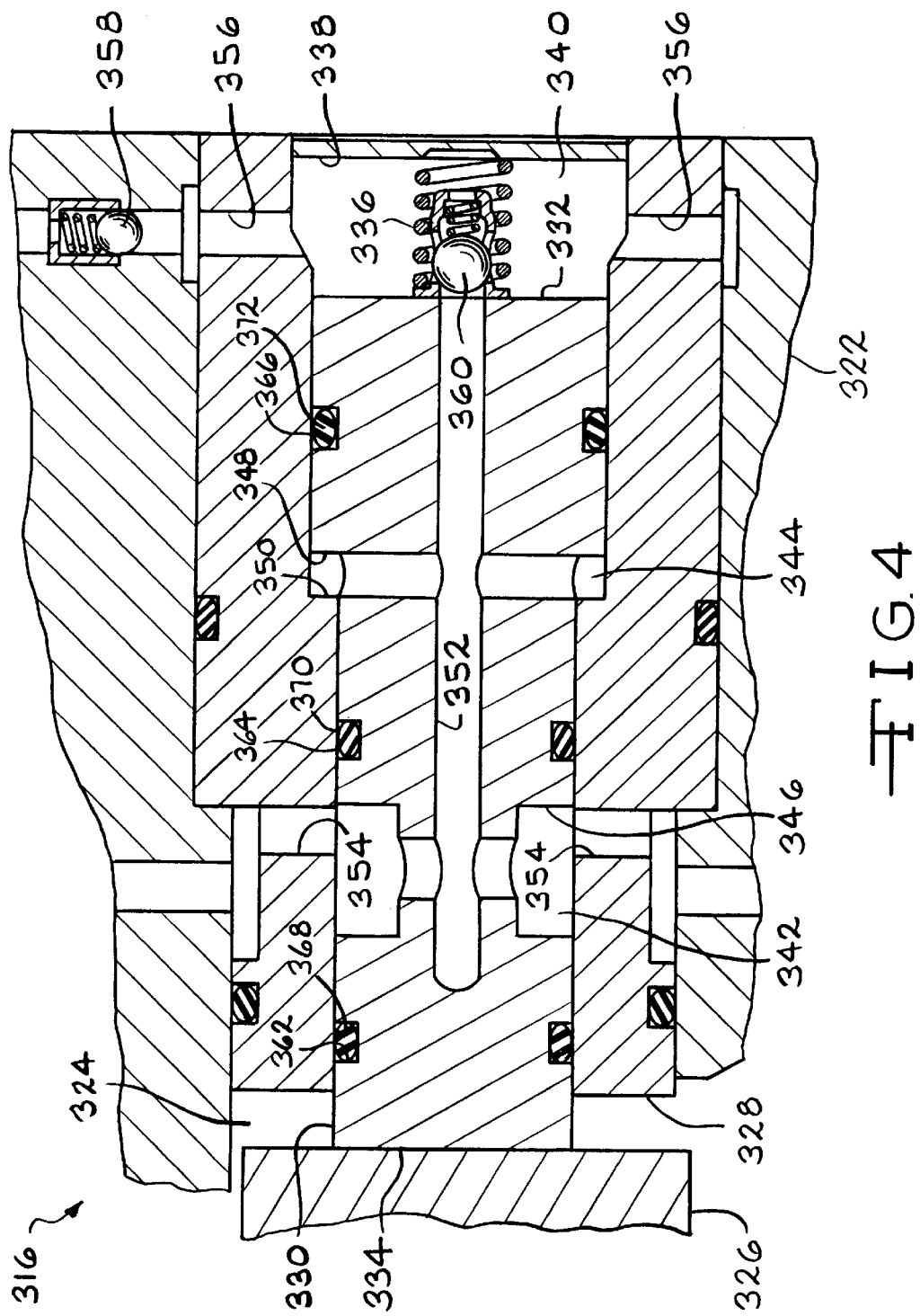
FIG. 4 is a sectional view of a portion of a third embodiment of the hydraulic control unit shown schematically in FIG. 1.

A sectional view of a portion of a third embodiment of a HCU is indicated generally at 316 in FIG. 4. The HCU 316 is similar to the HCU 116 of FIG. 2, and reference numerals in the 300 series are used to indicate like features in the 100 series. The primary difference between the HCU 316 and the HCU 116 is that the positions of the constant-volume chamber 342 and the second variable-volume chamber 344 have been switched when compared to the positions of the constant-volume chamber 142 and the second variable volume chamber 144.

The HCU 316 includes a pair of opposing sleeves 328 (only one shown), disposed in a housing 322. Each sleeve 328 has an enclosed end 338. A piston 330, having a first end 332 and a second end 334, is slidably disposed in each sleeve 328 with the first end 332 adjacent the enclosed end 338 for movement between a bottom-dead-center position and a top-dead-center position. FIG. 4 shows the piston 330 in the bottom-dead-center position.

Each piston 330 and corresponding sleeve 328 define a first variable-volume chamber 340, a constant-volume chamber 342 and a second variable-volume chamber 344. Each first variable-volume chamber 340 is bounded by the corresponding first end 332, the corresponding enclosed end 338, and the inner diametric surface of the corresponding sleeve 328 between the corresponding first end 332 and the corresponding enclosed end 338. Each constant-volume chamber 342 is bounded by the inner diametric surface of the corresponding sleeve 328 and an annular recess 346 formed in the corresponding piston 330 adjacent the corresponding second end 334. Each second variable-volume chamber 344 is bounded by the inner diametric surface of the corresponding sleeve 328, the outer diametric surface of the corresponding piston 334, a stepped portion 348 of the corresponding piston 330 adjacent the corresponding first variable-volume chamber 140, and a stepped portion 350 of the corresponding sleeve 328 adjacent the corresponding constant-volume chamber 142.

Each piston 330 includes an axial fluid passage 352 in fluid communication with the corresponding first variable-volume chamber 340, the corresponding constant-volume chamber 342 and the corresponding second variable-volume chamber 344.

Each sleeve 328 includes a pair of inlet channels 354 extending from the corresponding constant-volume chamber 342 that are adapted for placement in fluid communication with a fluid supply source (not shown). The placement of the inlet channels 354 is such that fluid communication is maintained between the inlet channels 354 and the corresponding constant-volume chamber 342 as the pistons 330 move between the bottom-dead center and top-dead-center positions.

The HCU 316 operates in a like manner to the HCU 116 as described, except that the fluid dynamic effect of drawing fluid from the fluid supply source to the first variable-volume chambers 140 by passing pressurized fluid from the second variable-volume chambers 144 past the constant-volume chambers 142 is not realized.

Figure 5:
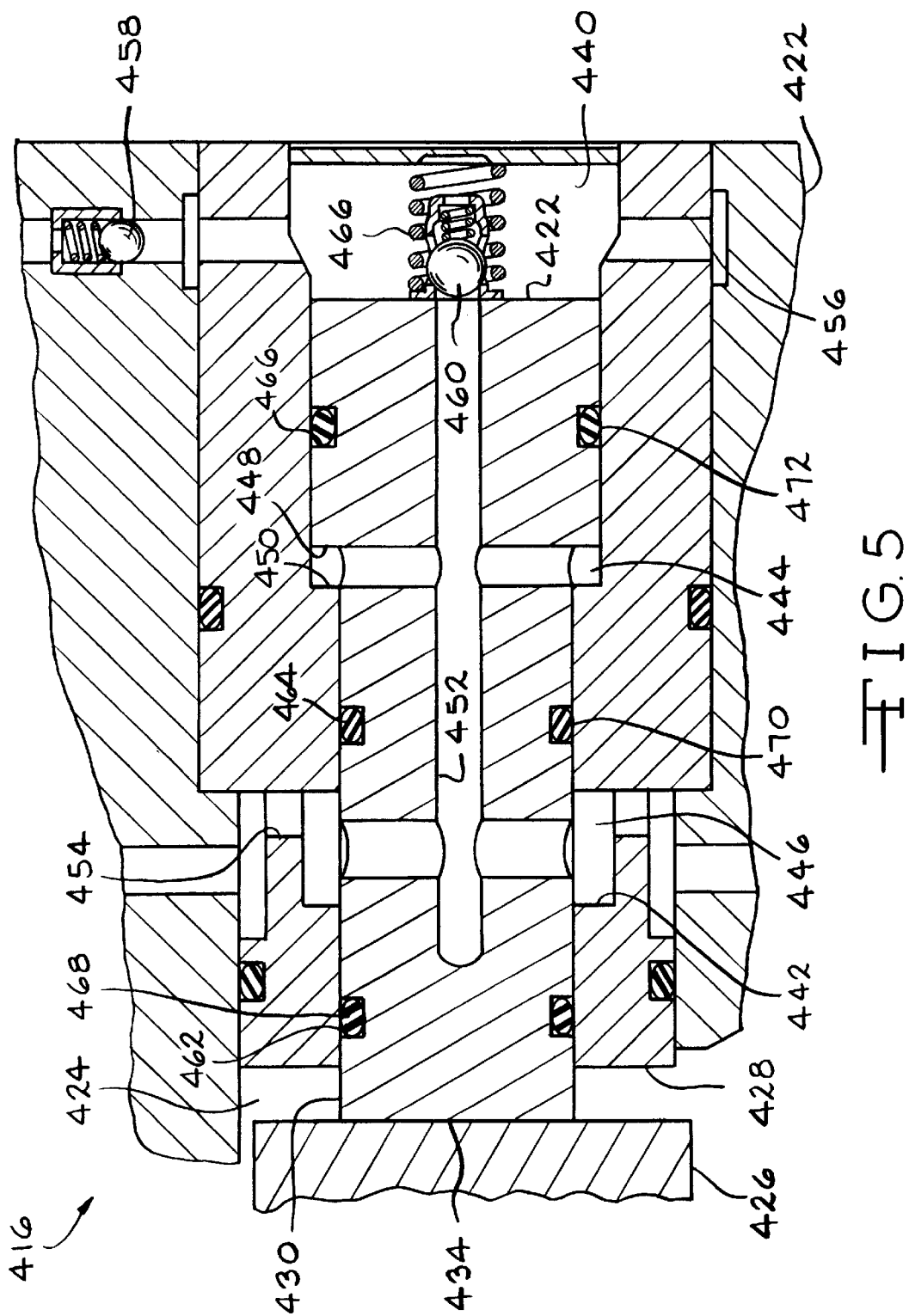
FIG. 5 is a sectional view of a portion of a fourth embodiment of the hydraulic control unit shown schematically in FIG. 1.

A sectional view of a portion of a fourth embodiment of a HCU is shown generally at 416 in FIG. 5. The HCU 416 is similar in structure and operation to the HCU 116 of FIG. 2, and like reference numerals in the 400 series arc used to indicate like features. The primary difference between the HCU 416 and the HCU 116 is that the recesses 146 formed in the pistons 130 have been replaced by a recess 446 formed in each of a pair of opposing sleeves 428.

This invention has been described as including a pump having dual complementary pistons 130, 230, 330, 430 and sleeves 128, 228, 328, 428. Preferably, the opposing pistons 130, 230, 330, 430 and sleeves 128, 228, 328, 428 are identical in structure. Alternatively, opposing pistons and sleeves may be used that are not identical in structure. Furthermore, this invention is not limited to a dual piston pump configuration, but may incorporate pump types having any number of pistons. In yet other embodiments, bores formed in the housing 122, 222, 322, 422 can provide a boundaries for the chambers in lieu of the boundaries provided by the sleeves 128, 228, 328, 428.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A hydraulic control unit for use in a vehicular brake system comprising:
    a housing having a cavity;
    eccentric drive means presenting a drive axis rotatably disposed in said cavity;
    a sleeve extending from said cavity and substantially perpendicular to said drive axis, said sleeve having a stepped portion formed thereon, and said sleeve further having at least one inlet channel formed therein and adapted for placement in fluid communication with a fluid supply source;
    a piston having a first end, a second end opposite said first end, an axial fluid passage extending from said second end a stepped portion adjacent said stepped portion of said sleeve, said first end being slidably disposed in said sleeve, said second end extending from said sleeve and engaging said drive means whereby said drive means moves said piston from a bottom-dead-center position to a top-dead-center position;
    biasing means for moving said piston from said top-dead-center position to said bottom-dead-center position;
    a first variable-volume chamber defined by said piston and said sleeve adjacent to said first end, whereby fluid is transferred from said first variable-volume chamber when said piston moves from said bottom-dead-center position to said top-dead-center position;
    a first check valve in fluid communication with said first variable-volume chamber and adapted for placement in fluid communication with at least one wheel brake for preventing fluid from flowing into said first variable-volume chamber through said at least one first check valve while allowing fluid to flow from said first variable-volume chamber through said at least one first check valve;
    a second check valve connected in fluid communication with said fluid passage and said first variable-volume chamber for preventing fluid from flowing from said first variable-volume chamber to said fluid passage while allowing fluid to flow from said fluid passage to said first variable-volume chamber;
    a constant-volume chamber defined by said sleeve and said piston, said constant-volume chamber being in fluid communication with said at least one inlet channel and said fluid passage, whereby fluid is transferred from the fluid supply source to said first variable-volume chamber when said piston moves from said top-dead-center position to said bottom-dead-center position; and
    a second variable-volume chamber defined by said piston and said sleeve between said stepped portion of said sleeve and said stepped portion of said piston, said second variable-volume chamber being in fluid communication with said fluid passage, whereby fluid is transferred from the fluid supply source to said second variable-volume chamber when said piston moves from said bottom-dead-center position to said top-dead-center position and fluid is transferred from said second variable-volume chamber to said first variable-volume chamber when said piston moves from said top-dead-center position to said bottom-dead-center position.

2. The hydraulic control unit according to claim 1 wherein said constant-volume chamber includes an annular recess formed in at least one of said sleeve and said piston.

3. The hydraulic control unit according to claim 2 wherein said recess is formed in said sleeve.

4. The hydraulic control unit according to claim 2 wherein said recess is formed in said piston.

5. The hydraulic control unit according to claim 2 wherein said second variable-volume chamber is adjacent said second end and said recess is between said first and second variable-volume chambers.

6. The hydraulic control unit according to claim 1 wherein said recess adjacent said second end and said second variable-volume is between said recess and said first variable-volume chamber.

7. A hydraulic control unit of a vehicular brake system comprising:

a housing having a cavity, drive means received in the cavity of the housing;

a fluid supply source in fluid communication with the housing;

a piston slidably disposed in the housing, the piston including a first end and a second end, wherein the second end is in contact with the drive means so that the piston moves from a bottom-dead-center position to a top-dead center position;

biasing means in contact with the first end of the piston so that the piston moves from a top-dead-center position to the bottom-dead-center position;

a first variable-volume chamber defined by the piston and the housing, whereby fluid is transferred from the first variable-volume chamber when the piston moves from the bottom-dead-center position;

a constant-volume chamber defined by the piston and the housing, whereby fluid is transferred from the fluid supply source to the first variable-volume chamber when the piston moves from the top-dead-center position to the bottom-dead-center position; and a second variable volume chamber defined by the piston and the housing, whereby fluid is transferred from the fluid supply source to the second variable-volume chamber when the piston moves from the bottom-dead-center position to the top-dead-center position.

8. The hydraulic control unit specified in claim 7 wherein fluid is transferred from the second variable-volume chamber to the first variable-volume chamber when the piston moves from the top-dead-center position to the bottom-dead-center position.

9. The hydraulic control unit specified in claim 7 wherein the piston is slidably received in a sleeve disposed in the housing.

10. The hydraulic control unit according to claim 9 wherein the constant-volume chamber includes an annular recess formed in at least one of the sleeve and the piston.

11. The hydraulic control unit according to claim 10 wherein the recess is formed in the sleeve.

12. The hydraulic control unit according to claim 10 wherein the recess is formed in the piston.

13. The hydraulic control unit according to claim 10 wherein the second variable-volume chamber is adjacent the second end of the piston and the recess is between the first and second variable-volume chambers.

14. The hydraulic control unit according to claim 10 wherein the recess is adjacent the second end of the piston and the second variable-volume is between the recess and the first variable-volume chamber.

* * * * *